J. Albright,
Horse-Collar Machine.
Nº 16,107.　　　　　　　　　Patented Nov. 25, 1856.
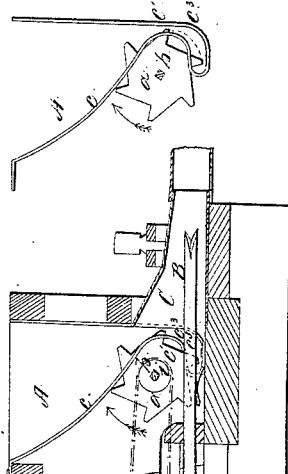
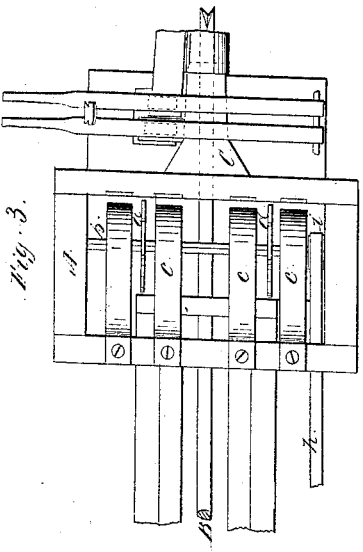
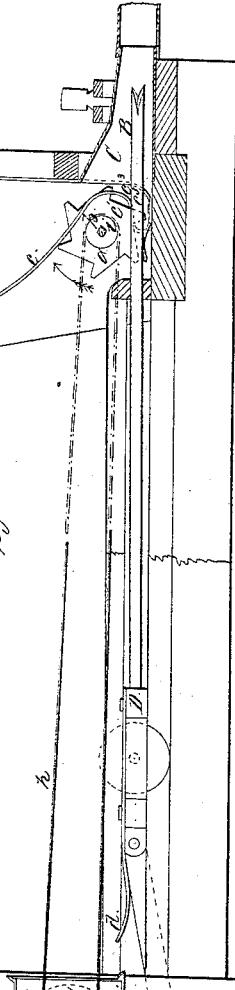
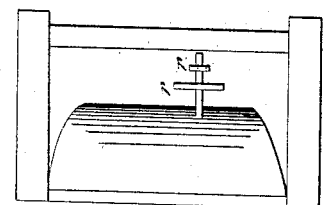
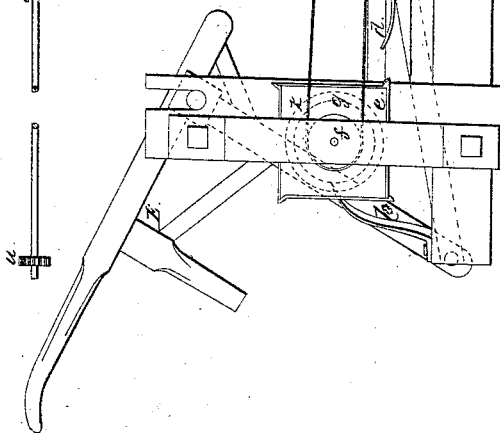
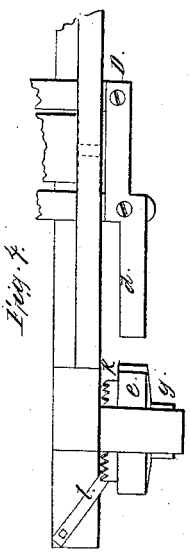

UNITED STATES PATENT OFFICE.

JOSEPH ALBRIGHT, OF GREENVILLE, TENNESSEE.

MACHINE FOR STUFFING HORSE-COLLARS.

Specification of Letters Patent No. 16,107, dated November 25, 1856.

*To all whom it may concern:*

Be it known that I, JOSEPH ALBRIGHT, of Greenville, in the county of Greene and State of Tennessee, have invented a certain new and useful Improvement in Machines for Stuffing Horse-Collars, of which the following is a full, clear, and exact description, reference being had to the accompanying drawing, which forms part of this specification, and in which—

Figure 1 represents a partly sectional side elevation of the entire machine: Fig. 2 a diagram of the hopper and feed wheel detached: Fig. 3 a plan or top view of the front or hopper portion of the machine: Fig. 4 a plan of a portion of the driving gear: and Fig. 5 a plan of a different feed arrangement for short straw.

My improvement has reference to that description of horse collar stuffing machines (several of which for alleged improvements in feeding the straw to the plunger and so forth have already been patented) in which the straw being cut into suitable length is placed within a hopper and at intervals drawn or fed down therein by various mechanical appliances for a reciprocating plunger-rod in its advance stroke to force it through a funnel mouthed tube into the main rim of the collar either end of which alternately is slipped over said tube and its other end secured by clamp, which general description is sufficient to identify my improvement as relating to a well known character of machine many details of which are necessarily involved in the machine represented in the accompanying drawing. Numerous defects in the feed of such machines I entirely obviate by the employment of intermittently rotating, thin, toothed wheels ($a$), whose teeth are suitably inclined, and while the wheels and their shaft or axis ($b$) are arranged outside of the hopper (thus preventing all clogging of the straw around them) their teeth project in front through the back rails or bars ($c$) of the hopper into the body of it near the bottom; and this is not all, but, in connection with this arrangement and action of the toothed wheels, the rails or bars ($c$), through which the teeth of said wheels project, are bent or shaped at their lower ends ($c'$) so as to form a curved continuation to the "inclined hopper-back" (which the back upper portion of said bars constitute) of a shape corresponding somewhat to the circular travel of the wheels ($a$) for the fourth part or thereabout of their lower travel, that is the front, lower part of their travel; and into the spaces thus formed by the curved lower ends ($c'$) of the rails, the wheels ($a$) draw the straw each intermittent action of said wheels and the necessary amount of straw is effectually held in said spaces ($c^3$) against all rising, by the edges of said spaces and teeth of the wheels, on the plunger (B) striking the straw to carry it through the funnel tube (C) into the collar, and the straw gradually entering these curved spaces ($c^3$), each intermittent movement of the wheels, is neither too hard pressed nor yet kept too loose, and the quantity fed for the action of the plunger to take hold of is regular under all conditions of the straw, and, as has before been observed, all clogging of the straw around the circular feed is avoided and no lifting of the straw by the rising portion of the feed wheels; while the slip of the straw down the inclined back of the hopper is greatly facilitated by the teeth of the wheels ($a$), where they enter in the top portion of their revolution between the bars ($c$), easing or forcing the straw from the "inclined back" toward the front of the hopper and downward through the necks of the spaces $c^3$. As it is only necessary that the curved spaces ($c^3$) should loosely (though securely against springing back and so forth) hold the straw which each intermittent movement of the wheels ($a$) draws down the hopper into them for the next advance stroke of the plunger to carry into the collar, and that the straw should not be too tightly wedged in said spaces ($c^3$) by the action of the wheels ($a$), I prefer the following devices or their equivalents for operating said wheels.

Attached to the roller plunger frame or carriage (D), which it may be observed is operated by a bell crank lever or handle (E), as a quick and powerful means of operating the plunger (B), is a spring ($d$) which, as the plunger is receded, strikes a square ($e$) having lips at its corners and gives said square the fourth of a revolution or thereabout, the square ($e$) being secured to a freely hung horizontal shaft ($f$). This shaft ($f$) carries a pulley ($g$) around which a belt ($h$) is passed connecting said pulley with another pulley ($i$) secured to the shaft of the wheels ($a$), and in this manner the feed wheels ($a$) are driven, intermittently, and they are prevented from wedging the straw too tightly in the curved spaces ($c^3$) of the hopper rails by the belt slipping on any tendency to tightly wedge taking place, while the spring ($d$) operating the square slightly yields on striking it so that the belt will not be caused to slip at such period of concussion but the wheels ($a$) at starting be given a firm and operative grip or hold on the straw in the hopper to carry it down.

A toothed wheel ($k$) on the shaft ($f$) and spring click ($l$) serves to retain the square ($e$) in place after a movement has been given it and hold it ready for another. This arrangement of course is better adapted for long cut straw, and, for short or fine cut straw, another hopper may be substituted (see Fig. 5) having feed blades ($r$), arranged at right angles to the former feed movement and within the hopper, a little to one side of the plunger, and intermittently driven by a shaft ($s$) lying parallel with the plunger (B) and operated by a pinion ($u$) at the other end of said shaft and made to gear with the toothed wheel ($k$) which is driven by the spring ($d$) and square ($e$).

I do not claim separately the toothed revolving feed arranged for operation in connection, from the outside, with a rack built hopper, as such is described in the patent granted to Gerard Sickels, Nov. 20th, 1855: nor yet do I claim, separately of themselves, the crooked fed straw retaining spaces ($c^3$) herein described, as the equivalent of such is found in the bearded rack described in the patent of H. G. Robertson, June 20th, 1856: but What I do claim as new and useful in horse collar stuffing machines, and desire to secure by Letters Patent, is—

The intermittently revolving toothed feed wheels ($a$) when arranged at the back and on the outside of the hopper, in combination with the crooked fed-straw retaining spaces or chambers ($c^3$) at the bottom of the hopper and extending backward as shown and described, the teeth of the wheels ($a$) (which work from the outside at the rear into the hopper) urging the slip of the straw down the inclined rack or back of the hopper and feeding it into the retaining spaces ($c^3$) to wait the action of the plunger, as herein set forth and whereby the many advantages specified are obtained.

In testimony whereof, I have hereunto subscribed my name.

JOSEPH ALBRIGHT.

Witnesses:
E. H. WEST,
R. H. WEST.